United States Patent
Ikonen

(10) Patent No.: US 10,374,487 B2
(45) Date of Patent: Aug. 6, 2019

(54) ELECTRIC MACHINE WITH AIR CHANNELS

(71) Applicant: ABB Schweiz AG, Baden (CH)

(72) Inventor: Janne Ikonen, Helsinki (FI)

(73) Assignee: ABB SCHWEIZ G, Baden (CH)

( * ) Notice: Subject to any disclaimer, the term of this patent is extended or adjusted under 35 U.S.C. 154(b) by 298 days.

(21) Appl. No.: 15/320,202

(22) PCT Filed: Jun. 11, 2015

(86) PCT No.: PCT/EP2015/063046
§ 371 (c)(1),
(2) Date: Dec. 19, 2016

(87) PCT Pub. No.: WO2015/193166
PCT Pub. Date: Dec. 23, 2015

(65) Prior Publication Data
US 2017/0141652 A1  May 18, 2017

(30) Foreign Application Priority Data

Jun. 19, 2014 (EP) .................................... 14173111

(51) Int. Cl.
*H02K 9/08* (2006.01)
*H02K 9/18* (2006.01)
(Continued)

(52) U.S. Cl.
CPC ............... *H02K 9/08* (2013.01); *H02K 5/18* (2013.01); *H02K 5/20* (2013.01); *H02K 9/06* (2013.01); *H02K 9/18* (2013.01)

(58) Field of Classification Search
CPC .. H02K 9/08; H02K 5/18; H02K 5/20; H02K 9/06; H02K 9/18
See application file for complete search history.

(56) References Cited

U.S. PATENT DOCUMENTS

| 5,925,947 A | 7/1999 | Kajiwara et al. |
| 8,794,943 B2 * | 8/2014 | Pekrul ........... F01C 1/3445 418/137 |

(Continued)

FOREIGN PATENT DOCUMENTS

| CN | 1078399 C | 1/2002 |
| CN | 101272070 A | 9/2008 |

(Continued)

OTHER PUBLICATIONS

Chinese Office Action dated Jun. 4, 2018; CN Application No. 201580031676.X; Applicant: ABB Schweiz AG; 16 pgs. (including translation).

(Continued)

*Primary Examiner* — Emily P Pham
(74) *Attorney, Agent, or Firm* — Taft Stettinius & Hollister LLP; J. Bruce Schelkopf

(57) ABSTRACT

The electric machine comprises a cylindrical rotor with axial first air channels and a stator with axial second air channels. The outer surface of the stator is provided with cooling fins. There is a first air chamber at a first end of the rotor, a second air chamber and an adjacent third air chamber at a second end of the rotor. A first fan circulates internal air from the first axial air channels to the second air channels in a closed air circulation within the electric machine. A second fan blows external cooling air from the outside of the electric machine through the third air chamber and from the outlet opening of the third air chamber along the outer surface of the stator. The number of second air channels in the stator is three.

20 Claims, 2 Drawing Sheets

(51) Int. Cl.
*H02K 5/18* (2006.01)
*H02K 5/20* (2006.01)
*H02K 9/06* (2006.01)

(56) References Cited

U.S. PATENT DOCUMENTS

| | | | | |
|---|---|---|---|---|
| 2010/0237727 A1* | 9/2010 | Mantere | .................. | H02K 9/10 310/64 |
| 2013/0171923 A1* | 7/2013 | Li | .......................... | H02K 1/32 454/284 |

FOREIGN PATENT DOCUMENTS

| | | | |
|---|---|---|---|
| CN | 106663992 A | 9/2008 | |
| EP | 1976098 A2 | 10/2008 | |

OTHER PUBLICATIONS

ABBmotorsgenerators: ABB High voltage rib cooled motor NXR—More know-how per kilogram, URL: http //www.youtbue.com/watch?v=EN0v5NwOtxA, Mar. 28, 2014.
International Search Report and Written Opinion, PCT/EP2015/063046, ABB Technology AG, dated Sep. 28, 2015, 11 pages.
European Search Report, EP14173111, ABB Technology AG, dated Oct. 30, 2014, 2 pages.

* cited by examiner

ELECTRIC MACHINE WITH AIR CHANNELS

FIELD OF THE INVENTION

The present invention relates to an electric machine.

BACKGROUND ART

An electric machine has a rotating rotor and a static stator surrounding the rotor. Small electric machines often have on open air circulation through the electric machine. There is a fan positioned on a shaft of the rotor and said fan blows air through the electric machine.

Medium sized electric machines are often provided with a closed internal air circulation within the electric machine. Air is circulated within the electric machine between the rotor and the stator in a closed loop. The rotor and the stator are provided with axial air channels through which the closed air circulation is arranged. There are further air chambers at both ends of the electric machine providing a flow connection between the axial channels in the rotor and the stator. There is further a first fan for circulating the internal air. The outer surface of the stator is provided with cooling fins in order to increase the area of the stator that can transfer heat from the stator to the surrounding air. The electric machine is further provided with a third air chamber positioned axially outside one of the two air chambers. The third air chamber has an inlet opening and an outlet opening being directed in the axial direction along the outer surface of the stator. A second fan sucks external cooling air through the inlet opening of the third air chamber and blows the cooling air from the outlet opening of the third air chamber axially along the outer surface of the stator.

There are prior art medium sized electric machines provided with a closed internal air circulation between the first axial air channels in the rotor and the second axial air channels in the stator within the electric machine having four axial second air channels in the stator. The two lower second air channels in the stator are formed in connection with the support members of the electric machine and positioned symmetrically in lower corners of the cross section of the electric machine. The two upper axial second air channels are positioned symmetrically in upper corners of the cross section of the electric machine. The four axial second air channels in the outer perimeter of the stator take up quite much of the outer surface of the stator reducing the space on the outer surface of the stator that can be provided with cooling fins. This will have a negative effect on the cooling of the electric machine.

EP 1 976 098 discloses a motor cooling arrangement. The electric machine comprises a stator surrounding a rotor having a first end and a second opposite end, and first axial air channels. The stator has axial second air channels and cooling fins on the outer surface of the stator. There is a first chamber at the first end of the rotor and a second chamber at the second end of the rotor, whereby a flow path is formed between the first air channels and the second air channels through the air chambers. There is further a third air chamber at the second end of the rotor axially outside of the second air chamber. The third air chamber has an outlet opening directed axially along the outer surface of the stator. A first fan circulates air in a closed air circulation from the first air chamber through the first air channels to the second chamber and further through the second air channels back to the first air chamber. A second fan blows external cooling air from the outside through the third air chamber and from the outlet opening of the third air chamber along the outer surface of the stator. The number of second air channels is one or more. The embodiment in FIG. 3 contains five second air channels.

U.S. Pat. No. 5,925,947 discloses a totally-enclosed type motor. The electric machine comprises a stator surrounding a rotor having a first end and a second opposite end, and first axial air channels. The stator has axial second air channels and cooling fins on the outer surface of the stator. There is a first chamber at the first end of the rotor and a second chamber at the second end of the rotor, whereby a flow path is formed between the first air channels and the second air channels through the air chambers. There is further a third air chamber at the second end of the rotor axially outside of the second air chamber. The third air chamber has an outlet opening directed axially along the outer surface of the stator. A first fan circulates air in a closed air circulation from the first air chamber through the first air channels to the second air chamber and further through the second air channels back to the first air chamber. A second fan blows external cooling air from the outside through the third air chamber and from the outlet opening of the third air chamber along the outer surface of the stator. The optimum number of second air channels is within a range of 5 to 12.

BRIEF DESCRIPTION OF THE INVENTION

An object of the present invention is to achieve an electric machine with an improved cooling arrangement.

The electric machine according to the invention is characterized by what is stated in the independent claim 1. Some preferred embodiments of the invention are disclosed in the dependent claims.

The electric machine comprises:

a cylindrical rotor having a first end, a second opposite end, and axial first air channels, a stator surrounding the rotor having axial second air channels and cooling fins on the outer surface of the stator, an enclosure surrounding the stator, whereby an outer air channel is formed between the stator and the enclosure, a first air chamber at the first end of the rotor and a second air chamber at the second end of the rotor, whereby a flow path is formed between the first air channels and the second air channels through the first air chamber and the second air chamber, a third air chamber at the second end of the rotor axially outside the second air chamber, said third air chamber having an outlet opening directed axially along the outer surface of the stator, a first fan for circulating internal air in a closed air circulation from the first air chamber through the first air channels to the second air chamber and further through the second air channels back to the first air chamber, a second fan for blowing external cooling air from the outside of the electric machine through the third air chamber and from the outlet opening of the third air chamber along the outer surface of the stator.

The electric machine is characterized in that:

the number of second air channels in the stator is three.

The use of three second air channels in the stator increases the free outer perimeter of the stator with at least 10% compared to prior art solutions where four second air channels are used. The increased free outer perimeter of the stator can be provided with cooling fins which thus increases the efficiency of the heat transfer from the stator to the cooling air passing in the outer air channel.

The second air channels are in an advantageous embodiment formed of two lower second air channels and one upper second air channel, whereby the lower second air channels are positioned symmetrically in lower corners of the cross section of the electric machine, and the upper second air channel is positioned on a vertical centre axis on the uppermost point of the cross section of the electric machine.

The upper second air channel can also be used as a cable route for passing cables from the connection box of the electric machine to the interior or the exterior of the electric machine.

The connection box can be positioned at either side of the upper second air channel in this arrangement as both side surfaces of the cross section of the electric machine are free. The electric machine can thus be provided with the possibility to freely choose on the installation site on which side of the upper second air channel the connection box will be positioned. The cables can in both alternatives pass in the upper second air channel.

The direction of the cooling fins that are positioned on the outer surface of the stator in the upper corners of the cross section of the electric machine at both sides of the upper second air channel are directed in a direction which is either between the horizontal direction and the radial direction or between the vertical direction and the radial direction. It is easier to make a cast where the direction of the cooling fins does not coincide with the radial direction. The direction of these cooling might also contribute to a slightly increased cooling efficiency.

The stator is made from iron by casting. A stator with four second air channels is more complex compared to a stator with three second air channels. It is thus easier to make a cast for a stator comprising three second air channels and also easier to cast a stator with three second air channels.

The use of three second air channels in the stator instead of four second air channels will thus result in a more efficient electric machine. The more efficient cooling of the electric machine means that the power of the electric machine can be increased.

The shaft height of the medium sized electric machine according to the invention is in the range of 355 to 560 mm.

The electric machine can be an electric motor or an electric generator.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
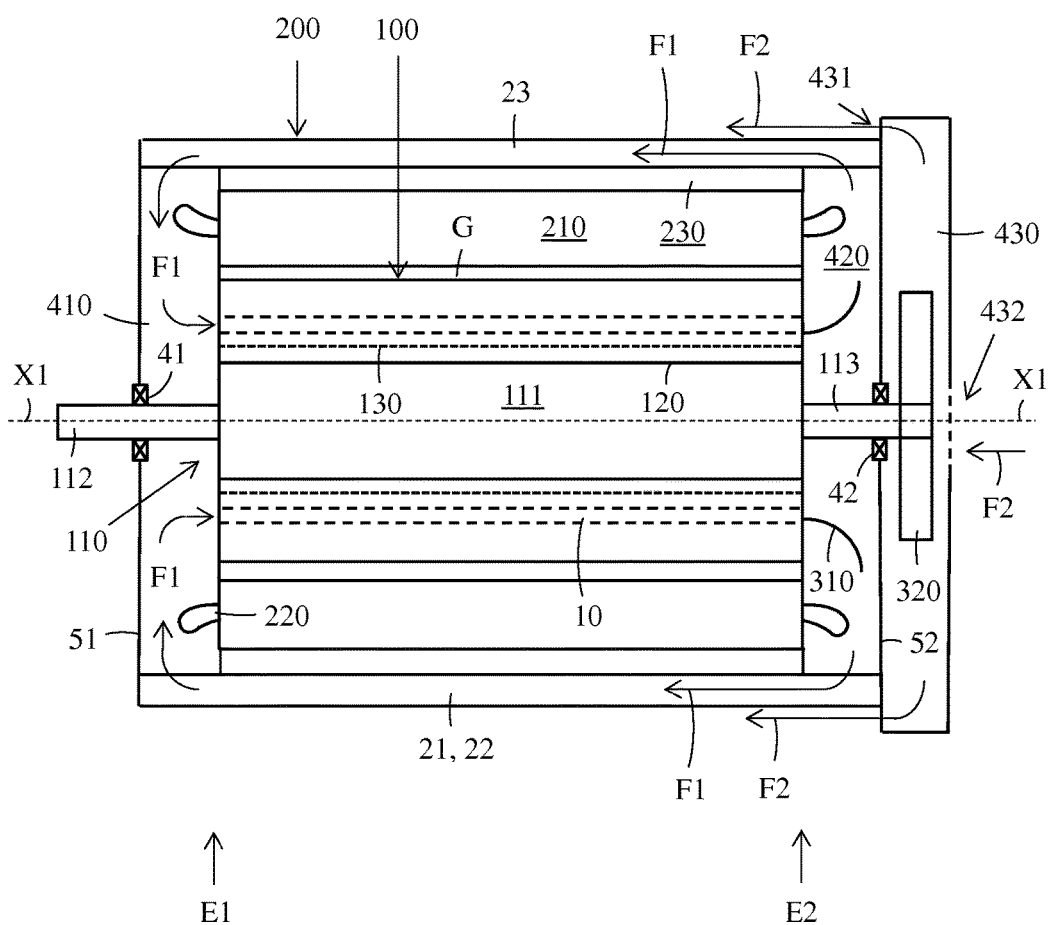
FIG. 1 shows an axial cross section of an electric machine.

FIG. 1 shows an axial cross section of an electric machine. The electric machine comprises a cylindrical rotating rotor 100 and a cylindrical stationary stator 200 surrounding the rotor 100. The stator 200 comprises a stator core 210, a stator winding 220 and a stator frame 230. The rotor 100 comprises a shaft 110 with a middle portion 111 and two opposite end portions 112, 113. The rotor 100 comprises further a rotor core 120 surrounding the middle portion 111 of the shaft 110. The rotor core 120 is attached to the middle portion 111 of the shaft and has a first end E1 and a second opposite end E2. The rotor core 120 comprises axial X1-X1 first air channels 10 extending between the first end E1 and the second end E2 of the rotor core 120. The rotor core 120 comprises further a rotor winding 130. There is an air gap G between the inner perimeter of the stator core 210 and the outer perimeter of the rotor core 120. There are further axial X1-X1 second air channels 21, 22, 23 formed into the stator frame 230. The second air channels 21, 22, 23 extend between end shields 51, 52 of the electric machine. The ends 220 of the stator winding are shown in the figure. The shaft 110 is supported at both end portions 112, 113 with bearings 41, 42 at the end shields 51, 52 of the electric machine. The end shields 51, 52 are attached to the stator frame 230.

There is a ring shaped first air chamber 410 at the first end E1 of the rotor core 120 and a ring shaped second air chamber 420 at the second end E2 of the rotor core 120. A first end of each of the first axial air channels 10 in the rotor core 120 is in flow communication with the first air chamber 410. A second end of each of the first axial air channels 10 in the rotor core 120 is in flow communication with the second air chamber 420. A first end of each of the second axial air channels 21, 22, 23 in the stator frame 230 is in flow communication with the first air chamber 410. A second opposite end of each of the second axial air channels 21, 22, 23 in the stator frame 230 is in flow communication with the second air chamber 420. There is thus a flow path between the first axial air channels 10 and the second axial air channels 21, 22, 23 at each end E1, E2 of the stator core 120. The second air channels 21, 22, 23 extend in the axial X1-X1 direction to the axially outer side wall of the first air chamber 410 and the second air chamber 420. There are three openings in the outer circumference of the first air chamber 410 and the second air chamber 420 i.e. one opening at each second air channel 20.

A first fan 310 is positioned in the second air chamber 420 at the second end E2 of the rotor core 120. The first fan 310 rotates with the rotor 100. The first fan 310 sucks internal air F1 along the first axial air channels 10 from the first air chamber 410 to the second air chamber 420. The first fan 310 blows the internal air F1 further radially outwards in the second air chamber 420 to the second ends of the second axial air channels 21, 22, 23 in the stator core 210. The internal air F1 flows from the second end of the second axial air channels 21, 22, 23 to the first end of the second axial air channels 21, 22, 23 and back to the first air chamber 410 at the first end E1 of the rotor core 120. This internal air circulation F1 between the stator 200 and the rotor 100 of the electric machine is a closed air circulation. This means that no external air can penetrate into this internal air circulation F1.

There is further a ring shaped third air chamber 430 at the second end E2 of the rotor core 120. The third air chamber 430 is positioned adjacent to the second air chamber 420 and axially X1-X1 outwardly from the second air chamber 420. The third air chamber 430 has a circular outlet opening 431 directed in the axial X1-X1 direction along the outer surface of the stator frame 230. The third air chamber 430 has further an axial X1-X1 inlet opening 432 in the middle portion of the outer end wall of the third air chamber 430.

A second fan 320 is positioned in the third air chamber 430. The second fan 320 rotates with the shaft 110 of the electric machine. The second fan 320 sucks cooling air F2 through the inlet opening 432 from the exterior of the electric machine and blows the cooling air F2 through the outlet opening 431 in the axial direction X1-X1 along the outer surface of the stator frame 430. There is thus no recirculation of this cooling air F2. The second fan 320 could naturally be driven by a drive motor of its own.

Figure 2:
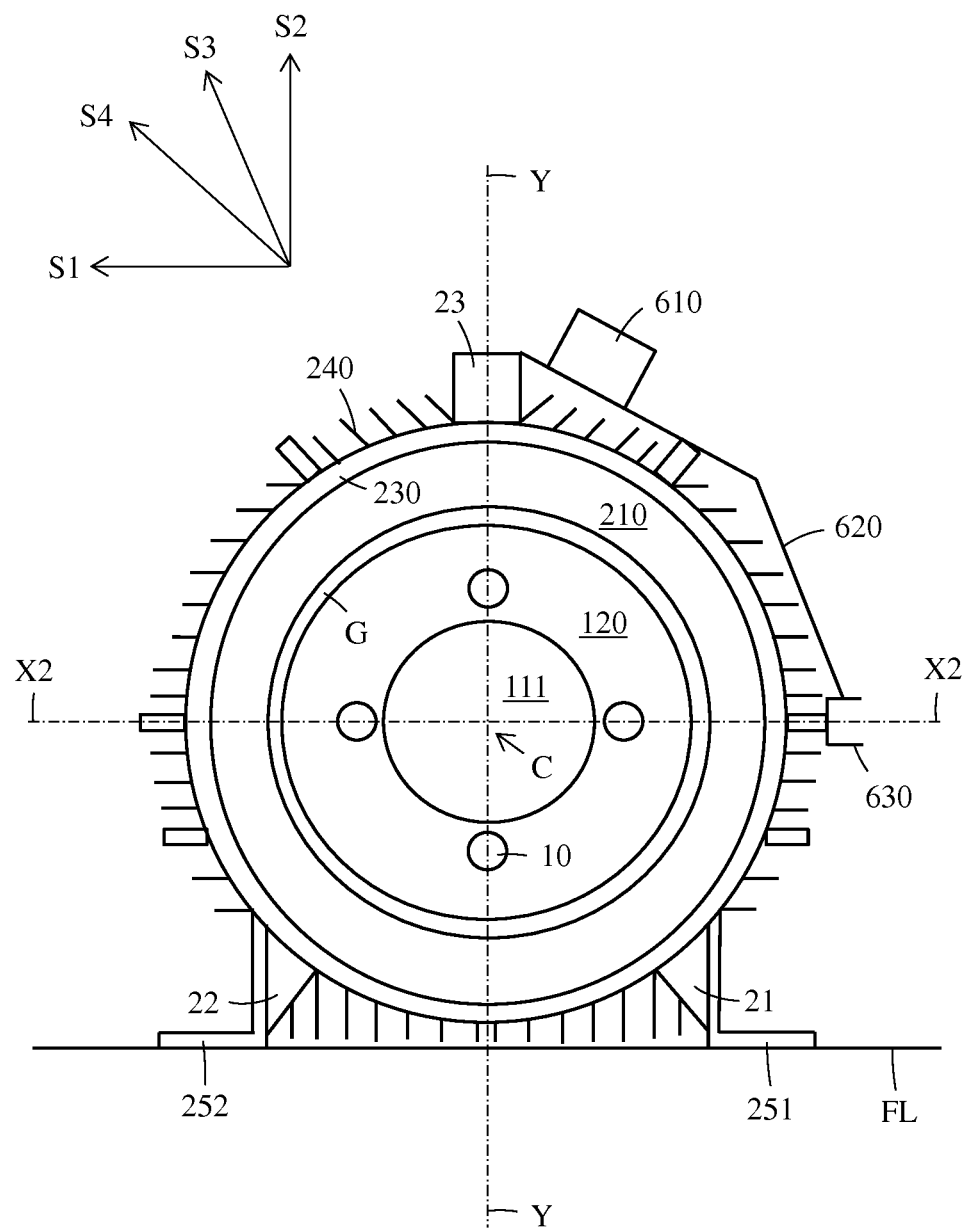
FIG. 2 shows a transverse cross section of the electric machine of FIG. 1.

FIG. 2 shows a transverse cross section of the electric machine of FIG. 1. The cross section shows the central portion 111 of the shaft 110, the rotor core 120 surrounding the central portion 111 of the shaft 110, the first axial air channels 10 in the rotor core 120, the air gap G between the rotor 100 and the stator 200, the stator core 210, the stator frame 230 and the second air channels 21, 22, 23 in the stator frame 230. The figure shows only four first axial air channels 10 in the rotor core 120, but there can be any number of first axial air channels 10 in the rotor core 120. The stator frame 230 is provided with cooling fins 240 extending outwardly from the outer surface of the stator frame 230. The cross section of the electric machine has a vertical centre axis Y-Y passing through the centre C of the shaft 111 of the electric machine and a horizontal centre axis X2-X2 also passing through the centre C of the shaft 111 of the electric machine.

The figure shows also the support structures 251, 252 of the electric machine, which are L-shaped parts formed as integral parts of the stator frame 230. The support structures 251, 252 extend along the whole axial X1-X1 length of the electric machine. The electric machine is attached with bolts from the support structures 251, 252 to the floor FL on the operation site of the electric machine. The support structures 251, 252 are positioned in lower corners of the cross section of the electric machine symmetrically in relation to the vertical centre line Y, Y of the cross section of the electric machine. The cross section of the support structures 251, 252 need not be L-shaped, but it could be of any appropriate shape. The cross section of the support structures 251, 252 could also vary along the axial X1-X1 length of the support structures 251, 252.

The figure shows further the second axial air channels 21, 22, 23 formed into the stator frame 230. There are three second axial air channels 21, 22, 23 formed as integral parts to the stator frame 230. There are two lower second axial air channels 21, 22 positioned in the lower corners of the cross section of the electric machine symmetrically in relation to the vertical centre line Y-Y of the cross section of the electric machine. Each of the lower second axial air channels 21, 22 are formed in connection with the support structures 251, 252 of the electric machine. The cross section of the two lower second air channels 21, 22 is triangular. There is further one upper second air channel 23 positioned on the top of the cross section of the stator frame 230. The vertical centre line of the upper second axial air channel 23 coincides with the vertical centre line Y-Y of the electric machine. The cross section of the upper second axial air channel 23 is rectangular. The cross section of the second air channels 21, 22, 23 could naturally be of any other appropriate form.

The cooling fins 240 positioned in the lower portion of the cross section of the electric machine between the support structures 251, 252 are directed in the vertical direction. The cooling fins 240 positioned in the side portions of the cross section of the electric machine are directed in the horizontal direction. The cooling fins 240 positioned in both upper corners of the cross section of the electric machine are directed in a direction S4 that is either between the horizontal direction S1 and the radial direction S3 or between the vertical direction S2 and the radial direction S3.

The electric machine comprises further a connection box 610 positioned on the outer surface of the stator frame 230 at the right side of the upper second axial air channel 23. A first cable rack 620 runs along the outer surface of the stator frame 230 from the connection box 610 to a second axially X1-X1 directed cable rack 630. These cable racks 620, 630 can be used as a cable route to and from the connection box 610. Also the upper second axial air channel 23 could be used as a cable route from the interior or the exterior of the electric machine to the connection box 610. The connection box 610 and the cable racks 620, 630 could easily be positioned on the left side of the upper second axial air channel 23 instead of on the right side of upper second axial air channel 23 as can be seen from the figure. The upper second axial air channel 23 could in both cases be used as a cable route.

The first fan 310 is in the embodiment shown in the figures situated in the first air chamber 410. The first fan 310 could naturally be positioned at any place in the circulating air L1 flow path between the first air chamber 410 and the second air chamber 420. The first fan 310 could also be provided with a drive motor of its own.

The second fan 320 is in the embodiment shown in the figures situated in the third air chamber 430. The second fan 320 could naturally be positioned at any place in the cooling air L2 flow path. There could naturally be a separate external air channel leading cooling air F2 to inlet opening 432 of the third air chamber 430.

The position of the first air chamber 410 at the first end E1 of the rotor 100 and the second 420 and the third 430 air chamber at the second opposite end E2 of the rotor 100 is an advantageous embodiment. The first end portion 112 of the shaft 110 protrudes from the electric machine from the first end of the electric machine. When the electric machine is an electric motor, the work machine to be driven by the electric motor is connected to the first end portion 112 of the shaft 110. When the electric machine is an electric generator, the driving machine which drives the electric generator is connected to the first end portion 112 of the shaft 110. The first end E1 of the rotor 100 is thus the drive end and the second end E2 of the rotor 100 is thus the non-drive end of the electric machine.

The rotor core 120 has a laminated structure being made of electrical steel sheets. The first air channels 10 in the rotor core 120 can thus be made by punching into the steel sheets. The stator core 230 has also a laminated structure being made of electrical steel sheets.

The invention is not limited to the examples described above but may vary within the scope of the claims.

The invention claimed is:

1. An electric machine comprises:
    a cylindrical rotor having a first end, a second opposite end, and axial first air channels,
    a stator surrounding the rotor having axial second air channels and cooling fins on an outer surface of the stator,
    a first air chamber at the first end of the rotor and a second air chamber at a second end of the rotor, whereby a flow path is formed between the first air channels and the second air channels through the first air chamber and the second air chamber,
    a third air chamber at the second end of the rotor axially outside the second air chamber, said third air chamber having an outlet opening directed axially along the outer surface of the stator,
    a first fan for circulating internal air in a closed air circulation from the first air chamber through the first air channels to the second air chamber and further through the second air channels back to the first air chamber,
    a second fan for blowing external cooling air from an outside of the electric machine through the third air chamber and from the outlet opening of the third air chamber along the outer surface of the stator, wherein a number of second air channels in the stator is three.

2. The electric machine according to claim 1 wherein the second air channels are formed of two lower second air channels and of one upper second air channel, whereby the lower second air channels are positioned symmetrically in lower corners of a cross section of the electric machine, and the upper second air channel is positioned on a vertical centre axis on an uppermost point of the cross section of the electric machine.

3. The electric machine according to claim 2, wherein the two lower second air channels are positioned in connection with support structures of the electric machine.

4. The electric machine according to claim 1 wherein the cooling fins positioned in a lower portion of a cross section of the electric machine between support structures are directed in a vertical direction.

5. The electric machine according to claim 1 wherein the cooling fins positioned in side portions of a cross section of the electric machine are directed in a horizontal direction.

6. The electric machine according to claim 1, wherein the cooling fins positioned in both upper corners of a cross section of the electric machine are directed in a direction that is either between a horizontal direction and a radial direction or between a vertical direction and the radial direction.

7. The electric machine according to claim 1 wherein the first fan is positioned within the second air chamber and that the first fan is driven by the rotor.

8. The electric machine according to claim 1 wherein the second fan is positioned within the third air chamber and that the second fan is driven by the rotor.

9. The electric machine according to claim 2 wherein the cooling fins positioned in a lower portion of the cross section of the electric machine between support structures are directed in a vertical direction.

10. The electric machine according to claim 3 wherein the cooling fins positioned in a lower portion of a cross section of the electric machine between support structures are directed in a vertical direction.

11. The electric machine according to claim 2 wherein the cooling fins positioned in side portions of the cross section of the electric machine are directed in a horizontal direction.

12. The electric machine according to claim 3 wherein the cooling fins positioned in side portions of a cross section of the electric machine are directed in a horizontal direction.

13. The electric machine according to claim 4 wherein the cooling fins positioned in side portions of the cross section of the electric machine are directed in a horizontal direction.

14. The electric machine according to claim 2 wherein the cooling fins positioned in both upper corners of the cross section of the electric machine are directed in a direction that is either between a horizontal direction and a radial direction or between a vertical direction and the radial direction.

15. The electric machine according to claim 3 wherein the cooling fins positioned in both upper corners of a cross section of the electric machine are directed in a direction that is either between a horizontal direction and a radial direction or between a vertical direction and the radial direction.

16. The electric machine according to claim 4 wherein the cooling fins positioned in both upper corners of the cross section of the electric machine are directed in a direction that is either between a horizontal direction and a radial direction or between the vertical direction and the radial direction.

17. The electric machine according to claim 5 wherein the cooling fins positioned in both upper corners of the cross section of the electric machine are directed in a direction that is either between the horizontal direction and a radial direction or between a vertical direction and the radial direction.

18. The electric machine according to claim 2 wherein the first fan is positioned within the second air chamber and that the first fan is driven by the rotor.

19. The electric machine according to claim 3 wherein the first fan is positioned within the second air chamber and that the first fan is driven by the rotor.

20. The electric machine according to claim 4 wherein the first fan is positioned within the second air chamber and that the first fan is driven by the rotor.

* * * * *